(12) United States Patent
Dezfooliyan et al.

(10) Patent No.: US 10,419,248 B2
(45) Date of Patent: Sep. 17, 2019

(54) METHOD AND APPARATUS FOR FREQUENCY DOMAIN INTER-CARRIER INTERFERENCE COMPENSATION

(71) Applicant: Samsung Electronics Co., Ltd., Gyeonggi-do (KR)

(72) Inventors: Amir Dezfooliyan, San Diego, CA (US); Vignesh Sethuraman, La Jolla, CA (US); Hyukjoon Kwon, San Diego, CA (US); Hamed Maleki, San Diego, CA (US); Linbo Li, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/436,309

(22) Filed: Feb. 17, 2017

(65) Prior Publication Data

US 2018/0167241 A1 Jun. 14, 2018

Related U.S. Application Data

(60) Provisional application No. 62/434,066, filed on Dec. 14, 2016.

(51) Int. Cl.
| | |
|---|---|
| *H04L 5/00* | (2006.01) |
| *H04L 25/02* | (2006.01) |
| *H04L 25/03* | (2006.01) |
| *H04L 27/26* | (2006.01) |
| *H04L 27/148* | (2006.01) |
| *H04L 27/233* | (2006.01) |

(52) U.S. Cl.
CPC ...... *H04L 25/03821* (2013.01); *H04L 5/0048* (2013.01); *H04L 25/0256* (2013.01); *H04L 27/148* (2013.01); *H04L 27/2334* (2013.01); *H04L 27/2657* (2013.01); *H04L 27/265* (2013.01); *H04L 27/2675* (2013.01)

(58) Field of Classification Search
CPC .............. H04L 5/0048; H04L 25/0256; H04L 25/03821; H04L 27/148; H04L 27/2334; H04L 27/265; H04L 27/2657; H04L 27/2675
See application file for complete search history.

(56) References Cited

U.S. PATENT DOCUMENTS 7,483,480 B2 * 1/2009 Guo .................. H04L 25/03044
375/232
7,684,501 B2 3/2010 Liu et al.
(Continued)

FOREIGN PATENT DOCUMENTS

EP 2645652 10/2013
WO WO 2015154801 10/2015

*Primary Examiner* — David B Lugo
(74) *Attorney, Agent, or Firm* — The Farrell Law Firm, P.C.

(57) ABSTRACT

Methods and apparatuses are provided in which a signal is received at a receiver. A processor of the receiver computes frequency offset (FO) inter-carrier interference (ICI) compensation, based on a real matrix part of an approximate ICI matrix and an FO estimated from the received signal. The processor applies the FO ICI compensation to the received signal in a frequency domain to produce an ICI compensated output. The processor applies a phase rotation to the ICI compensated output.

11 Claims, 6 Drawing Sheets

(56) References Cited

U.S. PATENT DOCUMENTS

| | | | |
|---|---|---|---|
| 7,784,015 B2 * | 8/2010 | Pitts | G06F 17/5072 |
| | | | 430/5 |
| 8,023,349 B2 * | 9/2011 | Cho | G11C 29/56 |
| | | | 365/201 |
| 8,040,790 B2 | 10/2011 | Ratnam et al. | |
| 8,155,252 B2 | 4/2012 | Piirainen et al. | |
| 8,498,363 B2 | 7/2013 | Van Nee et al. | |
| 8,897,121 B2 | 11/2014 | Xiao | |
| 9,178,727 B2 | 11/2015 | Dore et al. | |
| 2004/0005010 A1 * | 1/2004 | He | H04L 25/0204 |
| | | | 375/260 |
| 2004/0151142 A1 * | 8/2004 | Li | H04L 7/042 |
| | | | 370/335 |
| 2004/0161047 A1 * | 8/2004 | Liu | H04L 27/2657 |
| | | | 375/260 |
| 2008/0234003 A1 | 9/2008 | Carvalho et al. | |
| 2008/0240311 A1 * | 10/2008 | Piirainen | H04L 27/2657 |
| | | | 375/344 |
| 2009/0292750 A1 * | 11/2009 | Reyzin | G06F 7/483 |
| | | | 708/209 |
| 2011/0074500 A1 * | 3/2011 | Bouillet | H04L 27/0008 |
| | | | 329/347 |
| 2015/0063507 A1 * | 3/2015 | Dore | H04L 25/03159 |
| | | | 375/348 |
| 2015/0071105 A1 | 3/2015 | Farhang | |
| 2016/0211999 A1 | 7/2016 | Wild et al. | |
| 2016/0241275 A1 * | 8/2016 | MacMullan | H04B 1/1027 |
| 2017/0195158 A1 * | 7/2017 | Lin | H04L 27/2659 |

\* cited by examiner

METHOD AND APPARATUS FOR FREQUENCY DOMAIN INTER-CARRIER INTERFERENCE COMPENSATION

PRIORITY

This application claims priority under 35 U.S.C. § 119(e) to a U.S. Provisional patent application filed on Dec. 14, 2016 in the U.S. Patent and Trademark Office and assigned Ser. No. 62/434,066, the entire disclosure of which is incorporated herein by reference.

FIELD

The present disclosure relates generally to communication systems, and more particularly, to a method and an apparatus for frequency domain inter-carrier interference (ICI) compensation.

BACKGROUND

Orthogonal frequency-division multiplexing (OFDM) and single-carrier frequency division multiple access (SC-FDMA) techniques are examples of frequency division multiplexing techniques that are widely used in current communication standards including, for example, long term evolution (LTE), Wi-Fi, and digital video broadcasting (DVB). One important factor that needs to be considered in the baseband receiver design of these systems is carrier frequency offset (FO). When FO is comparable to the subcarrier spacing in OFDM and SC-FDMA systems, ICI is introduced. The resulting ICI may cause significant performance loss. The losses are severe at high modulation coding schemes, and can lead to 100% packet error rate. Vehicle-to-vehicle (V2V) communications can suffer from large frequency offsets comparable to the subcarrier spacing.

ICI compensation may be implemented in a baseband receiver of a user equipment (UE), such as, for example, a cell phone, in which computational complexity is of significant importance. Previous approaches require either large complex matrix inversion or multiple fast Fourier transform (FFT) operations, which impose a heavy burden on the receiver.

SUMMARY

According to an aspect of the present disclosure, a method is provided in which a signal is received at a receiver. A processor of the receiver computes FO ICI compensation, based on a real matrix part of an approximate ICI matrix and an FO estimated from the received signal. The processor applies the FO ICI compensation to the received signal in a frequency domain to produce an ICI compensated output. The processor applies a phase rotation to the ICI compensated output.

According to another aspect of the present disclosure, an apparatus is provided that includes an FFT unit for receiving a signal. The apparatus also includes a processor configured to compute FO ICI compensation, based on a real matrix part of an approximate ICI matrix and an FO estimated from the received signal. The processor is also configured to apply the FO ICI compensation to the received signal in a frequency domain to produce an ICI compensated output. The processor is further configured to apply a phase rotation to the ICI compensated output.

According to another aspect of the present disclosure, a non-transitory computer readable medium is provided with computer executable instructions stored thereon executed by a processor to receive a signal, compute FO ICI compensation, based on a real matrix part of an approximate ICI matrix and an FO estimated from the received signal, apply the FO ICI compensation to the received signal in a frequency domain to produce an ICI compensated output, and apply a phase rotation to the ICI compensated output.

According to another aspect of the present disclosure, a method is provided for manufacturing a processor in which the processor is formed as part of a wafer or package that includes at least one other processor. The processor is configured to receive a signal, compute FO ICI compensation, based on a real matrix part of an approximate ICI matrix and an FO estimated from the received signal, apply the FO ICI compensation to the received signal in a frequency domain to produce an ICI compensated output, and apply a phase rotation to the ICI compensated output. The processor is tested using one or more electrical to optical converters, one or more optical splitters that split an optical signal into two or more optical signals, and one or more optical to electrical converters.

According to another aspect of the present disclosure, a method is provided for constructing an integrated circuit. A mask layout is generated for a set of features for a layer of the integrated circuit. The mask layout includes standard cell library macros for one or more circuit features that include a processor configured to receive a signal, compute FO ICI compensation, based on a real matrix part of an approximate ICI matrix and an FO estimated from the received signal, apply the FO ICI compensation to the received signal in a frequency domain to produce an ICI compensated output, and apply a phase rotation to the ICI compensated output. Relative positions of the macros for compliance to layout design rules are disregarded during the generation of the mask layout. The relative positions of the macros are checked for compliance to layout design rules after generating the mask layout. Upon detection of noncompliance with the layout design rules by any of the macros, the mask layout is modified by modifying each of the noncompliant macros to comply with the layout design rules. A mask is generated according to the modified mask layout with the set of features for the layer of the integrated circuit. The integrated circuit layer is manufactured according to the mask.

BRIEF DESCRIPTION OF THE DRAWINGS

The above and other aspects, features, and advantages of the present disclosure will be more apparent from the following description when taken in conjunction with the accompanying drawings, in which.

DETAILED DESCRIPTION

Figure 1:
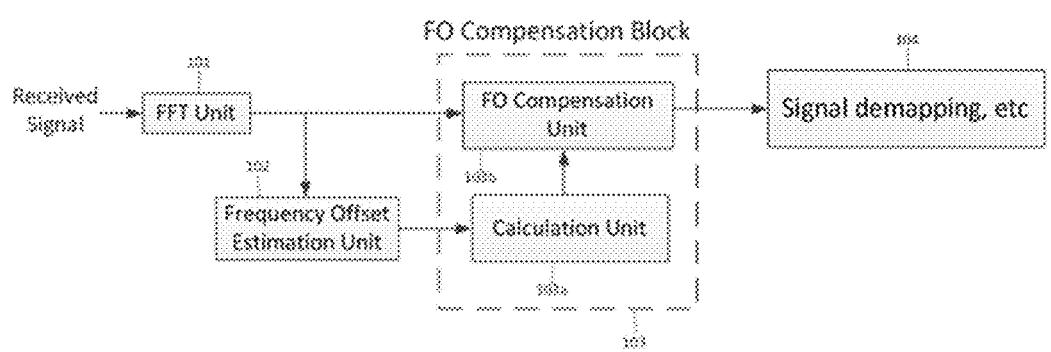
FIG. 1 is a block diagram illustrating an apparatus for frequency domain FO compensation, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their dictionary meanings, but are merely used to enable a clear and consistent understanding of the disclosure. Accordingly, it should be apparent to those skilled in the art that the following description of embodiments of the present disclosure are provided for illustrative purposes only and not for the purpose of limiting the present disclosure, as defined by the appended claims and their equivalents.

Although the terms including an ordinal number, such as first and second, may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

It is to be understood that the singular forms "a," "an," and "the" include plural referents unless the context clearly dictates otherwise. Thus, for example, reference to "an identifier" includes reference to one or more such identifiers.

In the present disclosure, it should be understood that the terms "include" and "have" indicate the existence of a feature, a number, a step, an operation, a structural element, parts, or a combination thereof, and do not exclude the existence or probability of one or more additional features, numerals, steps, operations, structural elements, parts, or combinations thereof.

The present disclosure introduces a method and an apparatus for new low complexity frequency domain ICI compensation that enables recovery of losses from ICI and significantly boosts performance.

Most previously proposed algorithms can be applied to single user scenarios. These algorithms do not support multi-user communication systems in which more than one user simultaneously transmits data on the non-overlapping resource blocks, which is of particular importance in V2V communication The present disclosure is particularly applicable to V2V or vehicle-to-everything (V2X) communication that can suffer a high FO due to a large relative speed. This may also be applicable to new radio (NR) 5G communication systems.

According to an embodiment of the present disclosure, frequency domain finite impulse response (FD-FIR) compensation is provided. The present disclosure provides ICI compensation directly in the frequency domain. Such a frequency domain approach may be applied to a communication system where one or more users simultaneously transmit data on the non-overlapping resource blocks. Multi-user compatibility is vital for V2V communication systems.

For FO compensation that requires matrix inversion (e.g., linear minimum mean square error (LMMSE) and zero-forcing (ZF)), the present disclosure applies circulant matrix power series approximation to reduce computation cost of matrix inversion. The computational complexity of the present disclosure is reduced to $O(M \log M)$ vs. $O(M^3)$ of a typical technique, where M is a number of allocated subcarriers.

According to one embodiment, the present disclosure uses FD-FIR to implement any pre-multiplication with a Toeplitz matrix or a circulant matrix. For a Toeplitz matrix, a linear convolution with zero padded allocated subcarriers is applied. For a circulant matrix, a circular convolution within the allocated subcarriers is applied.

By using FD-FIR compensation, filter taps may be calculated in a closed form. FD-FIR is only a function of the target user frequency offset and does not require any knowledge of interferers. Also, the present disclosure is computationally less expensive than other available FO compensation techniques. The present FIR filter may be implemented as a real filter with a constant phase rotation applied externally. This further reduces the implementation complexity.

Referring initially to FIG. 1, a block diagram illustrates an apparatus for frequency domain FO compensation, according to an embodiment of the present disclosure. As previously described, FO compensation can be implemented in the baseband receiver of a UE, such as, for example, a cell phone, in which computational complexity is of significant importance. An FFT unit 101 receives a signal in a time domain and converts the received signal to the frequency domain through an FFT operation. It may be considered that two or more users are simultaneously transmitting data. Resource block (RB) allocations of the users are non-overlapping. A target user may be referred to as user 0.

Assuming perfect frequency synchronization across all users, the baseband received signal after the FFT unit 101 is as shown in Equation (1). The model below is per symbol index m, and received antenna r. The indices are dropped for convenience.

$$Y = \sum_{u \in [0, U-1]} P_u V_u + Z \quad (1)$$

$V_u = H_u X_u$
U = number of users
N = FFT size determined by the system BW
$M_u = 12 N_{RB,u}$ is number of allocated subcarriers for user u
$F_u = N \times M_u$ selector matrix for user u's RB allocation. Since user allocations are non-overlapping, $P_{u_1}^T P_{u_2} = 0$ if $u_1 \neq u_2$. When user u occupies contiguous set of subcarriers $[N_u + 1 : N_u M_u]$ for some $N_u : 0 \leq N_u < N$, the selector matrix $P_u$ is represented as:

$$P_u = \begin{bmatrix} 0_{N_u \times M_u} \\ I_{M_u} \\ 0_{(N-N_u-M_u) \times M_u} \end{bmatrix}$$

$H_u = M_u \times M_u$ diagonal channel matrix for user u
$X_u = M_u \times 1$ desired signal (either DMRS or DFT of data vector)
$Z = N \times 1$ additive Gaussian noise with covariance $\sigma_Z^2 I$
$Y = N \times 1$ received vector In the presence of FO, the received signal in the time domain suffers a phase ramp. Denote the signal with user specific frequency offsets by $\breve{Y}$ in Equation (2):

$$\breve{Y} = \sum_{u \in [0, U-1]} \phi_u A_{\epsilon_u} P_u V_u + Z \qquad (2)$$

$$V_u = H_u X_u$$

$\Delta_{FO,u}$=FO in Hz for user u $$\epsilon_u = \frac{\Delta_{FO,u}}{B_{sc}}$$

is the FO for user u normalized by subcarrier spacing ($B_{sc}$Hz).

$$\phi_u = e^{j\left(2\pi\epsilon_u m\left(1+\frac{N_{CP}}{N}\right)+\theta_{0,u}\right)}$$

for OFDM symbol m, $\theta_{0,u}$ is a constant phase offset term for user $A_{\epsilon_u}$=N×N captures the ICI from FO of user u:

$$A_{\epsilon_u} = \frac{1}{N} F_N \Theta_{\epsilon_u} F_N^H \qquad (3)$$

$$\Theta_{\epsilon_u} = \text{diag}\left\{1, e^{j2\pi\epsilon_u \frac{1}{N}}, \ldots, e^{j2\pi\epsilon_u \frac{N-1}{N}}\right\}$$

$F_N$ is the N-point DFT matrix.

$$F_N(k, l) = e^{-j2\pi \frac{kl}{N}}; k, l \in [0, N-1] \qquad (4)$$

$$F_N^{-1} = \frac{1}{N} F_N^H$$

$\phi_u$ in Equation (2) is a scalar phase rotation in symbol in, and is constant within the symbol and varies across users. Note that the first principle diagonal term $\Theta_{\epsilon_u}$ is set to 1 by suitably choosing $\theta_{0,u}$. Since $\phi_0$ is constant within the symbol, it is no longer considered for ICI compensation methods, and $\overline{Y} = \phi_0^* \breve{Y}$.

$$\overline{Y} = A_{\epsilon_u} P_0 V_0 + \sum_{u \in [1, U-1]} \psi_u A_{\epsilon_u} P_u V_u + \overline{Z} \qquad (5)$$

$$V_u = H_u X_u$$

$$\psi_u = \phi_0^* \phi_u$$

Here, $\overline{Z} = \phi_0^* Z$ is the phase rotated additive Gaussian noise term.

In the multi-user model presented in Equation (5), the adjacent RBs occupied by other users are not decoded. The UE is only allowed to perform its operation on its own allocated subcarriers due to complexity. ICI compensation is then applied to the $M_0$ allocated subcarriers corresponding to the target user (i.e., user 0), as shown in Equation (6).

$$\overline{Y}_0^{tr} = B_0 V_0 + \sum_{u \in [1, U-1]} \psi_u B_u V_u + \tilde{Z} \qquad (6)$$

$$B_u = P_0^T A_{\epsilon_u} P_u \text{ for } u \in [0, U-1].$$

$$V_u = H_u X_u$$

Additive noise term: $\tilde{Z} = P_0^T \overline{Z}$.

$\overline{Y}_0^{tr}$ is the $M_0 \times 1$ truncated received vector corresponding to the target user.

A main objective of the present disclosure is to extract $X_0$ from Equation (6) through a frequency offset estimation unit 102 and an FO compensation block 103 of FIG. 1.

Matrix $A_{\epsilon_u}$ is a complex circulant matrix, and matrix $B_u$ is a complex Toeplitz matrix. It can be shown, in Equation (7), that, for any k,l∈[0, N−1], and any normalized FO $\epsilon_u$:

$$A_{\epsilon_u}(k, l) = g_\epsilon(k-l) \qquad (7)$$

$$g_{\epsilon_u}(k) = \frac{\sin\pi(\epsilon_u - k)}{N \sin\frac{\pi(\epsilon_u - k)}{N}} e^{j\pi(\epsilon_u - k)\left(1 - \frac{1}{N}\right)}$$

Figure 2:
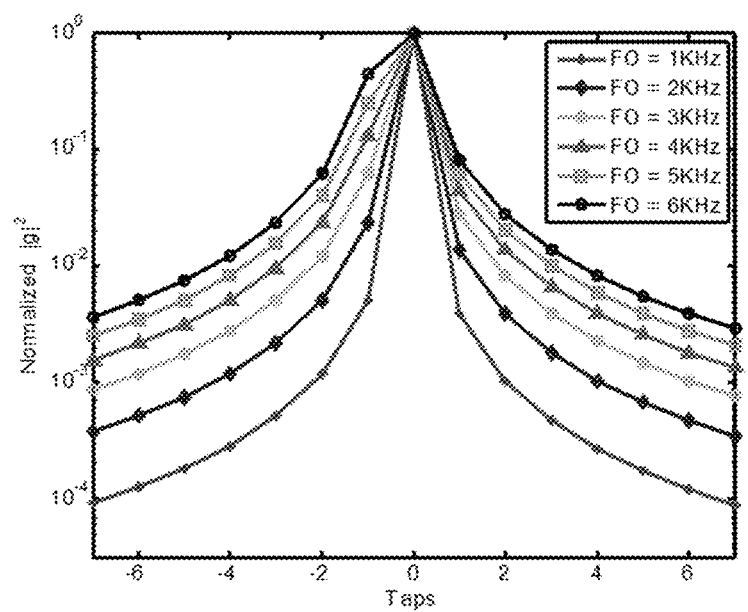
FIG. 2 is a chart showing strength of the strongest taps of $g_{\epsilon_u}(k)$ for frequency offsets of 1 KHz to 6 KHz.

FIG. 2 is a chart showing strength of the strongest taps of $g_{\epsilon_u}(k)$ for frequency offsets of 1 KHz to 6 kHz. Tap strength is calculated as a square magnitude of the taps. Tap strength decays very fast as it moves away from the central tap.

As tap strength decays very fast away from the central tap, the following approximation of $A_{\epsilon_u}$ and $B_u$ can be made, as shown in Equations (8) and (9). This approximation is used to reduce implementation complexity of the proposed FO compensation.

$$\tilde{A}_{\epsilon_u}(k, l) = \tilde{g}_{\epsilon_u}(k-l) \qquad (8)$$

$$0 \leq k, l \leq N-1$$

$$\tilde{g}_{\epsilon_u}(k) = \begin{cases} \frac{\sin\pi\epsilon_u}{\pi} \frac{1}{(\epsilon_u - k)} e^{j\pi\epsilon_u} & -L_F \leq k < L_F \\ 0 & o.w. \end{cases} \qquad (9)$$

$$\tilde{B}_u = P_0^T \tilde{A}_{\epsilon_u} P_u$$

where $L_F$ is a design parameter. As function $g_{\epsilon_u}(k)$ decays rapidly away from k=0, $L_F$ can be chosen much smaller than N.

In Equation (9), $\tilde{B}_u$ can be represented as a real matrix with elements $$\frac{\sin\pi\epsilon_u}{\pi} \frac{1}{(\epsilon_u - k)}$$

followed by a common phase factor of $e^{j\pi\epsilon_u}$, as shown in Equation (10). The real matrix is used to reduce computation complexity of ICI compensation algorithms.

$$\tilde{B}_u = e^{j\pi\epsilon_u} \tilde{B}_{real,u} \qquad (10)$$

$$\tilde{B}_{real,u} = \frac{\sin\pi\epsilon_u}{\pi} toeplitz(1./(\epsilon_u - N_0 + N_u - [0:M_0-1]),$$

$$1./(\epsilon_u - N_0 + N_u + \lceil 0:M_u-1 \rceil))$$

Here, 1./x: denotes an element wise division of the vector, and toeptitz($v_C$, $v_R$) refers to a Toeplitz matrix with a first column given by $V_C$ and a first row given by $v_R$.

Referring back to FIG. 1, a frequency offset estimation unit 102 extracts pilot signals of the received signal in the frequency domain and applies FO estimation to estimate the FO. The estimated FO is provided from the frequency offset estimation unit 102 to a calculation unit 103a of an FO compensation block 103. The calculation unit 103a uses the estimated FO to determine an FO ICI compensation.

While embodiments of the present disclosure describe the application FD-FIR for a matched filter solution, it is noted that the present disclosure is more general and not specific to the matched filter. FD-FIR can be used to implement any pre-multiplication with any Toeplitz matrix or circulant matrix. For Toeplitz matrices, a linear convolution with zero padded allocated subcarriers is applied. For circulant matrices, a circular convolution within the allocated subcarriers is applied.

A matched filter solution requires only a transpose conjugate of $B_0$. The matrix filter tap calculation does not involve any matrix inversion or multiplication, and is computationally less expensive than LMMSE or ZF solutions. The matched filter is only a function of the target user frequency offset and does not require any knowledge of interferers, as shown in Equation (11).

$$\hat{V}_0^{MF} = B_0^H \bar{Y}_0^{tr} \quad (11)$$

Equation (11) may be practically implemented as FD-FIR with FIR taps ($h_{FD-FIR}(k)$) calculated with the closed form, as shown in Equation (12)

$$h_{FD-FIR}(k) = \frac{\sin\pi(\epsilon_0+k)}{N\sin\frac{\pi(\epsilon_0+k)}{N}} e^{-j\pi(\epsilon_0+k)\left(1-\frac{1}{N}\right)} - \frac{N}{2} \le k < \frac{N}{2} \quad (12)$$

The estimated $\hat{V}_0^{MF}$ is followed by the channel equalizer to estimate $\hat{X}_0$ from $\hat{V}_0^{MF}$. Using $\tilde{B}_0$ from Equations (9) and (10), matched filter can be applied as a real matrix with taps calculated as $$\frac{\sin\pi\epsilon_0}{\pi} \frac{1}{(\epsilon_0+k)};$$

followed by the constant phase rotation $e^{-j\pi\epsilon_0}$, which is common across subcarriers, as shown in Equation (13).

$$\hat{V}_0^{MF} = \tilde{V}_0^{MF} = e^{-j\pi\epsilon_0} \tilde{B}_{real,C}^T \bar{Y}_0^{tr} \quad (13)$$

Here, $$\epsilon_0 = \frac{\Delta_{FO}}{B_{sc}}$$

is the target user FO ($\Delta_{FO}$) normalized by subcarrier spacing ($B_{sc}$), and N is the FFT size determined by the communication system bandwidth. As filter tap strength decays very fast away from the central tap, shorter length FIR filters may be considered that include the strongest taps of the full FIR, as shown in Equation (14). This significantly reduces an implementation cost of the FIR filter.

$$\tilde{h}_{FD-FIR}(k) - \frac{\sin\pi\epsilon_0}{\pi(\epsilon_0+k)} e^{-j\pi\epsilon_0} - L_F \le k \le L_F \quad (14)$$

where $L_F$ is a design parameter. The FIR tap length is $L_{F/R} = 2L_F + 1$.

Referring back to FIG. 1, the real FD-FIR filter taps $$\frac{\sin\pi\epsilon_0}{\pi} \frac{1}{(\epsilon_0+k)}$$

computed in the calculation unit 103a are provided to an FO compensation unit 103b of the FO compensation block 103, along with the received signal in the frequency domain from FFT unit 101. The FO compensation unit 103b applies the real FD-FIR filter taps to the received signal in the frequency domain to obtain an ICI compensated output. The FO compensation unit 103b then applies phase rotation $e^{-j\pi\epsilon_0}$ on the ICI compensated output. The phase rotated ICI compensated output is provided from the FO compensation unit 103b to the remaining blocks of the apparatus including, for example, signal demapping and channel estimation, in block 104.

Referring back to the calculation unit 103a of FIG. 1, an alternative type of FO compensation includes LMMSE and ZF compensation. While embodiments of the present disclosure describe a circulant matrix power series approximation as a means to apply LMMSE and ZF FO compensation, the present circulant matrix power series approximation is more general and not specific to the LMMSE and ZF. The computation complexity of any FO compensation technique that requires matrix inversion can be reduced by using circulant power series approximation.

Joint LMMSE FO compensation and channel equalization can be considered for ICI compensation as shown in Equation (15).

$$\hat{X}_0^{LMMSE} = H_0^H B_0^H \left( \sum_{u \in [0,U-1]} B_u C_u B_u^H + \sigma_Z^2 I_{M_0} \right)^{-1} \bar{Y}_0^{tr} \quad (15)$$

$$C_u = E[V_u V_u^H] = p_u H_u H_u^H$$

where $p_u = M_u \times M_u$ is a diagonal power allocation matrix to user u subcarriers.

$\hat{X}_0^{LMMSE}$ is calculated per OFDM symbol since it is a function of instantaneous channel $H_u$. For interfering users, there may not be knowledge of the instantaneous channel structure $H_u H_u^H$, or the channel power delay provide (PDP) $E_{H_u}[H_u H_u^H]$. Also, power loading $p_u$ may not readily available. Furthermore, the frequent calculation of the LMMSE matrix would be a burden on hardware complexity. Although it is observed that LMMSE would be superior to other methods, the complexity may quickly become a limiting factor.

Using $\tilde{B}_u$ from Equations (9) and (10), a covariance matrix becomes a real matrix. $\tilde{B}_0^H (\Sigma_{u \in [0,U-1]} \tilde{B}_u C_u \tilde{B}_u^H + \sigma_Z^2 I_{M_0})^{-1}$ can be implemented as a real matrix followed by a common phase factor of $e^{-j\pi\epsilon_0}$. This follows $H_0^H$ which performs as matched filter channel equalizer, as shown in Equation (16).

$$\hat{X}_0^{LMMSE} \approx \tilde{X}_0^{LMMSE} = e^{-j\pi\epsilon_0} H_0^H \tilde{B}_{real,0}^T \tilde{R}_{real,LMMSE}^{-1} \bar{Y}_0^{tr} \quad (16)$$

-continued $$\tilde{R}_{real,LMMSE} = \sum_{u \in [0,U-1]} \tilde{B}_{real,u} C_u \tilde{B}_{real,u}^T + \sigma_Z^2 I_{M_0}$$

It is noted that $R_{real,LMMSE}$ is a matrix of real numbers.

In Equation (16), the ICI from FO and the channel distortion is jointly equalized. However, embodiments of the present disclosure first estimate $V_0$ in an LMMSE fashion, and use that for subsequent channel equalization, as shown in Equation (17).

$$\hat{V}_0^{LMMSE} = C_0 B_0^H \left( \sum_{u \in [0,U-1]} B_u C_u B_u^H + \sigma_Z^2 I_{M_0} \right)^{-1} \overline{Y}_0^{tr} \quad (17)$$

The estimated $\hat{V}_0^{LMMSE}$ should be followed by the channel equalizer to estimate $\hat{X}_0$ from $\hat{V}_0^{LMMSE}$. By the assumption $E[V_u V_u^H] \approx I_{M_u}$, the LMMSE solution can be approximated as shown in Equation (18).

$$\hat{V}_0^{LMMSE} \approx B_0^H \left( \sum_{u \in [0,U-1]} B_u B_u^H + \sigma_Z^2 I_{M_0} \right)^{-1} \overline{Y}_0^{tr} \quad (18)$$

The estimator operates only on $M_0$ subcarriers allocated to the target user. The approximate LMMSE still requires knowledge of the interferers' RB allocation and FO to calculate the covariance matrix.

Using $\tilde{B}_u$ from Equations (9) and (10), the covariance matrix becomes a real matrix. $\tilde{B}_0^H (\Sigma_{u \in [0,U-1]} \tilde{B}_u \tilde{B}_u^H + \sigma_Z^2 I_{M_0})^{-1}$ can be implemented as a real matrix followed by a common phase factor of $e^{-j\pi \epsilon_0}$, as shown in Equation (19).

$$\hat{V}_0^{LMMSE} \approx \tilde{V}_0^{LMMSE} = \quad (19)$$
$$e^{-j\pi\epsilon_0} \tilde{B}_{real,0}^T \left( \sum_{u \in [0,U-1]} \tilde{B}_{real,u} \tilde{B}_{real,u}^T + \sigma_Z^2 I_{M_0} \right)^{-1} \overline{Y}_0^{tr}$$

The zero-forcing FO compensation solution can be mathematically expressed as shown in Equation (20).

$$\hat{V}_0^{ZF} = B_0^{-1} \overline{Y}_0^{tr} \quad (20)$$

The estimated $\hat{V}_0^{ZF}$ should be followed by the channel equalizer to estimate $\hat{X}_0$ from $\hat{V}_0^{ZF}$. Since $B_0$ itself is only a function of frequency offset, and not a function of $H_0$, it is not needed to recalculate the matrix inversion per symbol. Here, interference is treated as noise and knowledge of the interferers is not used.

Using $\tilde{B}_0$ from Equations (9) and (10), ZF can be implemented as a real matrix followed by the common phase factor of $e^{-j\pi\epsilon_0}$, as shown in Equation (21).

$$\hat{V}_0^{ZF} \approx \tilde{V}_0^{ZF} = e^{-j\pi\epsilon_0} \tilde{B}_{real,0}^{-1} \overline{Y}_0^{tr} \quad (21)$$

In the FO compensation, the challenge is matrix inversion in calculation of the ICI compensation. The ICI compensation methods require $M_0 \times M_0$ Toeplitz matrix inversion which generally requires $M_0^3$ multiplications. To reduce the computation complexity, the approximation of inverse may be explored by using matrix power series. The Toeplitz matrix is approximated by circulant and the inversion property of circulant matrices is used. When $C(x)$ is a circulant matrix with a first column as a vector x, $C^{-1}(x)$ can be obtained as shown in Equation (22) below.

$$C^{-1}(x) = F^{-1}(1/F(x))F \quad (22)$$

where F is the Fourier transform; and
1/F (x) is element-wise inversion.

Denoting the Toeplitz matrix as $\Gamma$, the following matrix power series can be developed, as shown in Equation (23).

$$\Gamma^{-1} = (R+E)^{-1} = R^{-1}(I+G)^{-1} = R^{-1}(I-G+G^2-G^3+\ldots) G = ER^{-1} \quad (23)$$

R is constrained to be a circulant matrix and hence easier to invert than $\Gamma$. E is an $M_0 \times M_0$ residual error matrix where more than a half of elements are zero. Thus, the power series of $G = ER^{-1}$ can be calculated with lower complexity than $\Gamma^{-1}$. Computing $R^{-1}$ requires only $O(M_0 \log M_0)$ operations.

Depending on the desired inversion accuracy, different approximation orders can be used. To make the approximations more accurate, a scaling constant $0 < \alpha \leq 1$ is introduced.

For example, for $1^{st}$ order approximation, Equation (24) is provided.

$$\Gamma^{-1} \approx R^{-1}(I-\alpha_1 G) \quad (24)$$

For $2^{nd}$ order approximation, Equation (25) is provided.

$$\Gamma^{-1} \approx R^{-1}(I-G+\alpha_2 G^2) \quad (25)$$

In one embodiment, $\alpha_1 = \alpha_2 = 0.8$ may be used.

Signal demapping block 104 receives an output of the FO compensation unit 103b for various functions such as signal demapping and decoding.

According to one embodiment, the present system and method provides real FD-FIR compensation that is calculated based on the real part of the approximate ICI matrix. The filter taps are determined based on the type of FO compensation algorithm such as, for example, matched filter, ZF, and LMMSE. For FO compensation that requires matrix inversion (e.g., ZF and LMMSE), the present system applies circulant matrix power series approximation to reduce the computation cost of matrix inversion.

Figure 3:
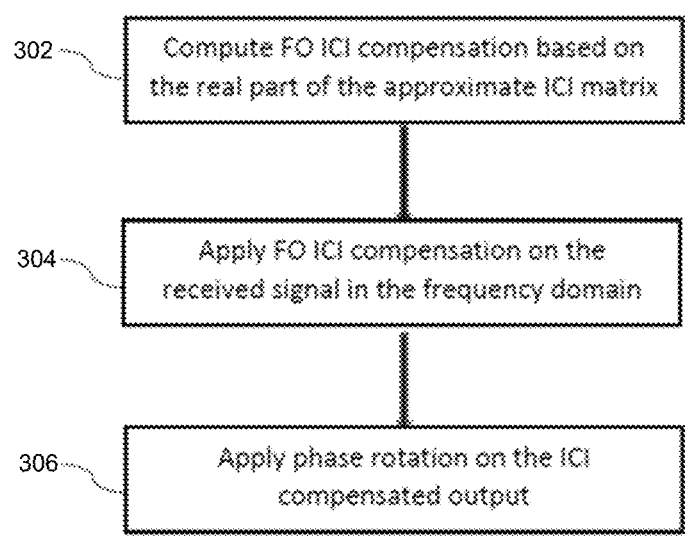
FIG. 3 is a flow diagram illustrating frequency domain FO compensation methodology, according to an embodiment of the present disclosure.

Referring now to FIG. 3, a flow diagram illustrates frequency domain FO compensation methodology, according to an embodiment of the present disclosure. In step 302, FO ICI compensation (real FD-FIR filter taps) is computed based on the real part of the approximate ICI matrix. Matched filter, ZF, or LMMSE can be used for this calculation, as described in detail above. For algorithms that involve matrix inversion (i.e., ZF and LMMSE), circulant matrix power series approximation is used to reduce computation complexity. In step 304, the FO ICI compensation (real FD-FIR filter taps) is applied on a received signal in the frequency domain to obtain an ICI compensated output. In step 306, phase rotation is applied to the ICI compensated output. This phase rotation can be absorbed to symbol-by-symbol phase rotation or integrated with channel estimation and compensated in a channel equalizer. The steps of FIG. 3 are set forth below in a formulaic manner for matched filter solution.

$$\tilde{h}_{FD-FIR}^{real}(k) = \frac{\sin \pi \epsilon_0}{\pi(\epsilon_0 + k)} \longrightarrow \hat{V}_0 = \tilde{h}_{FD-FIR}^{real} * \overline{Y}_0^{tr} \longrightarrow \tilde{V}_0 = e^{-j\pi\epsilon_0} \hat{V}_0$$

Compute FD-FIR taps   Apply taps to signal   Apply phase rotation
(302)                  (304)                   (306)

Figure 4:
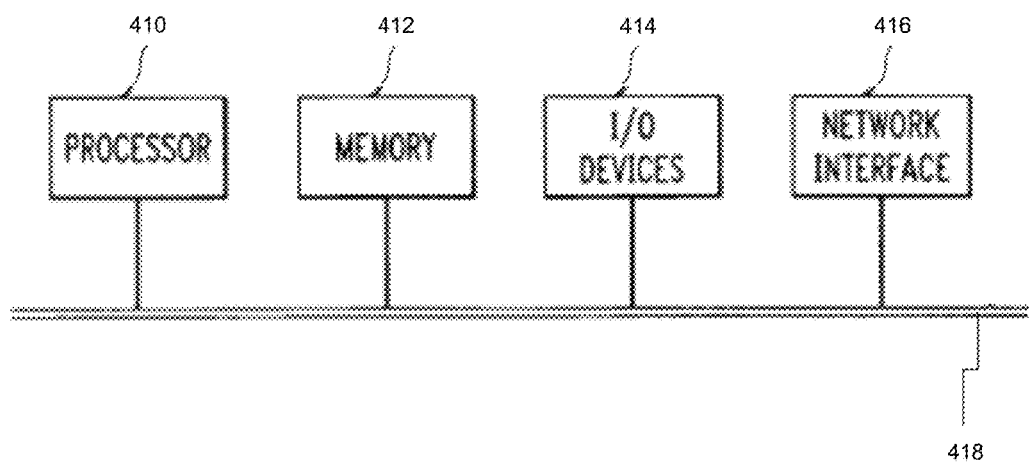
FIG. 4 is a block diagram illustrating an illustrative hardware implementation of a computing system, according to an embodiment of the present disclosure.

Referring now to FIG. 4, a block diagram illustrates an illustrative hardware implementation of a computing system in accordance with which one or more components/methodologies of the disclosure (e.g., components/methodologies described in the context of FIGS. 1 and 3) may be implemented. As shown, the computer system may be implemented in accordance with a processor 410, a memory 412, input/output (I/O) devices 414, and a network interface 416, coupled via a computer bus 418 or alternate connection arrangement.

It is to be appreciated that the term "processor", as used herein, is intended to include any processing device, such as, for example, one that includes, but is not limited to, a central processing unit (CPU) and/or other processing circuitry. It is also to be understood that the term "processor" may refer to more than one processing device and that various elements associated with a processing device may be shared by other processing devices.

The term "memory", as used herein, is intended to include memory associated with a processor or CPU, such as, for example, random access memory (RAM), read only memory (ROM), a fixed memory device (e.g., hard drive), a removable memory device, and flash memory.

In addition, the phrase "input/output devices" or "I/O devices", as used herein, is intended to include, for example, one or more input devices for entering information into the processor or processing unit, and/or one or more output devices for outputting information associated with the processing unit.

Still further, the phrase "network interface", as used herein, is intended to include, for example, one or more transceivers to permit the computer system to communicate with another computer system via an appropriate communications protocol. This may provide access to other computer systems.

Software components, including instructions or code, for performing the methodologies described herein may be stored in one or more of the associated memory devices (e.g., ROM, fixed or removable memory) and, when ready to be utilized, loaded in part or in whole (e.g., into RAM) and executed by a CPU.

Figure 5:
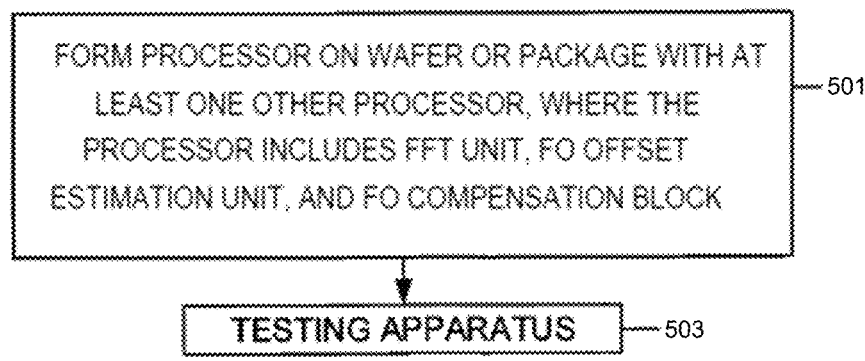
FIG. 5 is a flow diagram of a method of testing a processor configured to provide frequency domain FO compensation, according to an embodiment of the present disclosure.

FIG. 5 is a flowchart of a method of testing a processor configured to provide frequency domain FO compensation according to an embodiment of the present disclosure, where the processor is either implemented in hardware or implemented in hardware that is programmed with software Referring to FIG. 5, the method, at 501, forms the processor as part of a wafer or package that includes at least one other processor. The processor is configured to receive a signal, compute frequency offset (FO) inter-carrier interference (ICI) compensation, based on a real matrix part of an approximate ICI matrix and an FO estimated from the received signal, apply the FO ICI compensation to the received signal in a frequency domain to produce an ICI compensated output, and apply a phase rotation to the ICI compensated output. At 503, the method tests the processor. Testing the processor includes testing the processor and the at least one other processor using one or more electrical to optical converters, one or more optical splitters that split an optical signal into two or more optical signals, and one or more optical to electrical converters.

Figure 6:
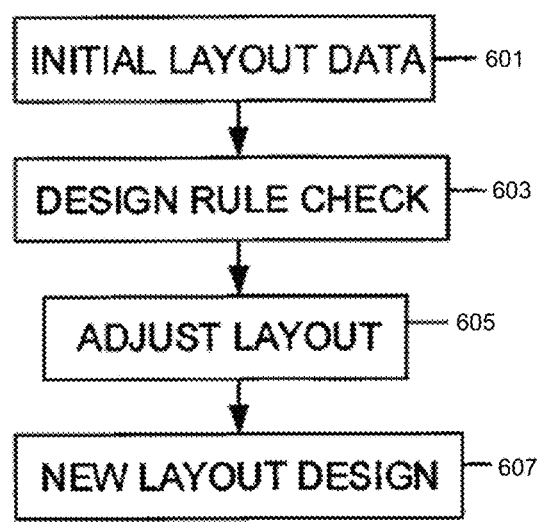
FIG. 6 is a flow diagram of a method of manufacturing a processor configured to provide frequency domain FO compensation, according to an embodiment of the present disclosure.

FIG. 6 is a flowchart of a method of manufacturing a processor configured to provide frequency domain FO compensation, according to an embodiment of the present disclosure.

Referring to FIG. 6, the method, at 601, includes an initial layout of data in which the method generates a mask layout for a set of features for a layer of an integrated circuit. The mask layout includes standard cell library macros for one or more circuit features that include a processor. The processor is configured to receive a signal, compute frequency offset (FO) inter-carrier interference (ICI) compensation, based on a real matrix part of an approximate ICI matrix and an FO estimated from the received signal, apply the FO ICI compensation to the received signal in a frequency domain to produce an ICI compensated output, and apply a phase rotation to the ICI compensated output.

At 603, there is a design rule check in which the method disregards relative positions of the macros for compliance to layout design rules during the generation of the mask layout.

At 605, there is an adjustment of the layout in which the method checks the relative positions of the macros for compliance to layout design rules after generating the mask layout.

At 607, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask Embodiments of the present disclosure provide low complexity frequency domain ICI compensation to recover losses from ICI and to boost performance significantly. The frequency domain operation combined with real FD-FIR approximation reduces computation cost significantly. Additionally, circulant matrix power series approximation is employed to be able to use an FFT operation for inverse calculation.

The present disclosure may be utilized in conjunction with the manufacture of integrated circuits, which are considered part of the methods and apparatuses described herein.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:
1. A method, comprising:
  receiving a signal at a receiver;
  computing, by a processor of the receiver, frequency offset (FO) inter-carrier interference (ICI) compensation, based on a real matrix part of an approximate ICI matrix and an FO estimated from the received signal, wherein the approximate ICI matrix is a function of the FO, and wherein the FO ICI compensation includes real frequency domain-finite impulse response (FD-FIR) filter taps based on matched filter;
  applying, by the processor, the FO ICI compensation to the received signal in a frequency domain to produce an ICI compensated output; and
  applying, by the processor, a phase rotation to the ICI compensated output,
  wherein the real FD-FIR filter taps are

$$\frac{\sin\pi\epsilon_0}{\pi} \frac{1}{(\epsilon_0 + k)},$$

where $$\epsilon_0 = \frac{\Delta_{FO}}{B_{sc}}$$

is the target user FO ($\Delta_{FO}$) normalized by the subcarrier spacing ($B_{sc}$).

2. The method of claim 1, wherein the signal is received in a time domain, and further comprising:
converting the signal to a frequency domain.

3. The method of claim 2, further comprising:
extracting pilot signals from the signal in the frequency domain; and
estimating the FO from the received signal using the extracted pilot signals.

4. The method of claim 1, wherein the phase rotation is $e^{-j\pi\epsilon_0}$, where $$\epsilon_0 = \frac{\Delta_{FO}}{B_{sc}}$$

is me target user FO ($\Delta_{FO}$) normalized by subcarrier spacing ($B_{sc}$).

5. The method of claim 1, further comprising performing signal demapping and channel estimation with respect to the phase rotated ICI compensated output.

6. An apparatus, comprising:
a fast Fourier transform (FFT) unit for receiving a signal; and
a processor configured to:
compute frequency offset (FO) inter-carrier interference (ICI) compensation, based on a real matrix part of an approximate ICI matrix and an FO estimated from the received signal, wherein the approximate ICI matrix is a function of the FO, and wherein the FO ICI compensation includes real frequency domain-finite impulse response (FD-FIR) filter taps based on matched filter;
apply the FO ICI compensation to the received signal in a frequency domain to produce an ICI compensated output; and
apply a phase rotation to the ICI compensated output, wherein the real FD-FIR filter taps are $$\frac{\sin\pi\epsilon_0}{\pi} \frac{1}{(\epsilon_0 + k)},$$

where $$\epsilon_0 = \frac{\Delta_{FO}}{B_{sc}}$$

is the target user FO ($\Delta_{FO}$) normalized by the subcarrier spacing ($B_{sc}$).

7. The apparatus of claim 6, wherein the signal is received in a time domain and the FFT unit is further configured to convert the signal to a frequency domain.

8. The apparatus of claim 7, further comprising a frequency offset estimation unit configured to:
extract pilot signals from the signal in the frequency domain; and
estimate the FO from the received signal using the extracted pilot signals.

9. The apparatus of claim 6, wherein the phase rotation is $e^{-j\pi\epsilon_0}$, where $$\epsilon_0 = \frac{\Delta_{FO}}{B_{sc}}$$

is me target user FO ($\Delta_{FO}$) normalized by subcarrier spacing ($B_{sc}$).

10. The apparatus of claim 6, wherein the processor is further configured to perform signal demapping and channel estimation with respect to the phase rotated ICI compensated output.

11. A non-transitory computer readable medium with computer executable instructions stored thereon executed by a processor to perform a method comprising:
receiving a signal;
computing frequency offset (FO) inter-carrier interference (ICI) compensation, based on a real matrix part of an approximate ICI matrix and an FO estimated from the received signal, wherein the approximate ICI matrix is a function of the FO, and wherein the FO ICI compensation includes real frequency domain-finite impulse response (FD-FIR) filter taps based on matched filter;
applying the FO ICI compensation to the received signal in a frequency domain to produce an ICI compensated output; and
applying a phase rotation to the ICI compensated output, wherein the real FD-FIR filter taps are $$\frac{\sin\pi\epsilon_0}{\pi} \frac{1}{(\epsilon_0 + k)},$$

where $$\epsilon_0 = \frac{\Delta_{FO}}{B_{sc}}$$

is the target user FO ($\Delta_{FO}$) normalized by the subcarrier spacing ($B_{sc}$).

* * * * *